US009013366B2

(12) United States Patent
Zheng et al.

(10) Patent No.: US 9,013,366 B2
(45) Date of Patent: Apr. 21, 2015

(54) DISPLAY ENVIRONMENT FOR A PLURALITY OF DISPLAY DEVICES

(75) Inventors: Qixing Zheng, Bellevue, WA (US); Mark Yalovsky, Seattle, WA (US); Thomas Scott Coon, Kirkland, WA (US); Christopher E. Swan, Seattle, WA (US); Alex Snitkovskiy, Renton, WA (US); Gabriel S. DeBacker, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 245 days.

(21) Appl. No.: 13/198,478

(22) Filed: Aug. 4, 2011

(65) Prior Publication Data

US 2013/0033414 A1 Feb. 7, 2013

(51) Int. Cl.
*G09G 5/00* (2006.01)
*G09G 3/20* (2006.01)

(52) U.S. Cl.
CPC ........................................ *G09G 3/20* (2013.01)

(58) Field of Classification Search
CPC ............. G09G 3/20; G01S 19/21; H04B 1/10
USPC .......................................................... 345/1.1
See application file for complete search history.

(56) References Cited

U.S. PATENT DOCUMENTS

| | | | | |
|---|---|---|---|---|
| 5,712,995 | A * | 1/1998 | Cohn | 715/792 |
| 5,920,316 | A * | 7/1999 | Oran et al. | 715/779 |
| 5,923,307 | A * | 7/1999 | Hogle, IV | 345/4 |
| 6,437,776 | B1 * | 8/2002 | Walz | 715/753 |
| 6,636,246 | B1 * | 10/2003 | Gallo et al. | 715/805 |
| 6,727,917 | B1 * | 4/2004 | Chew et al. | 715/765 |
| 6,823,525 | B1 * | 11/2004 | Martyn | 719/323 |
| 7,134,094 | B2 * | 11/2006 | Stabb et al. | 715/827 |
| 7,142,192 | B2 | 11/2006 | De Waal | |
| 7,308,550 | B2 * | 12/2007 | Cornett | 711/170 |
| 7,636,899 | B2 | 12/2009 | Purcell et al. | |
| 7,681,134 | B1 * | 3/2010 | Grechishkin et al. | 715/740 |
| 8,312,113 | B2 * | 11/2012 | Kennedy | 709/220 |
| 8,595,642 | B1 * | 11/2013 | Lagassey | 715/781 |
| 8,615,544 | B2 * | 12/2013 | Raju et al. | 709/202 |
| 8,754,855 | B2 * | 6/2014 | Duncan et al. | 345/173 |
| 2002/0191018 | A1 * | 12/2002 | Broussard | 345/746 |
| 2003/0090473 | A1 * | 5/2003 | Joshi | 345/173 |

(Continued)

OTHER PUBLICATIONS

Simone, Maya., "How to View Two Monitors on One Computer With Two Different Programs", Retrieved at <<http://www.ehow.com/how_6792022_two-computer-two-different-programs.html>>, Jul. 29, 2010, pp. 3.

(Continued)

*Primary Examiner* — Kevin M Nguyen
*Assistant Examiner* — Sejoon Ahn
(74) *Attorney, Agent, or Firm* — Henry Gabryjelski; Kate Drakos; Micky Minhas

(57) ABSTRACT

A display environment for a plurality of display devices is described. In one or more implementations, a display environment of an operating system of a computing device is configured to display a plurality of shells that support user interaction with the operating system by launching a first shell for display on a first display device of the computing device and launching a second shell for display on a second display device of the computing device such that the first and second shells are displayable simultaneously by the computing device.

20 Claims, 11 Drawing Sheets

(56) References Cited

U.S. PATENT DOCUMENTS

| | | | |
|---|---|---|---|
| 2003/0112271 A1* | 6/2003 | Batalden et al. | 345/744 |
| 2004/0236874 A1* | 11/2004 | Largman et al. | 710/8 |
| 2004/0263424 A1* | 12/2004 | Okuley | 345/1.1 |
| 2005/0020358 A1* | 1/2005 | Cram | 463/31 |
| 2005/0253775 A1* | 11/2005 | Stewart | 345/1.1 |
| 2006/0034042 A1* | 2/2006 | Hisano et al. | 361/681 |
| 2006/0143571 A1* | 6/2006 | Chan | 715/764 |
| 2006/0161889 A1* | 7/2006 | Stabb et al. | 717/113 |
| 2006/0255121 A1* | 11/2006 | Putman et al. | 235/379 |
| 2006/0277492 A1* | 12/2006 | Matthews et al. | 715/789 |
| 2007/0002037 A1* | 1/2007 | Kuroki et al. | 345/418 |
| 2007/0013722 A1* | 1/2007 | Souza | 345/660 |
| 2007/0133015 A1* | 6/2007 | Saeki et al. | 358/1.2 |
| 2007/0165370 A1* | 7/2007 | Leng | 361/683 |
| 2008/0012831 A1* | 1/2008 | Bauman et al. | 345/173 |
| 2008/0061128 A1* | 3/2008 | Putman et al. | 235/379 |
| 2008/0077874 A1* | 3/2008 | Garbow et al. | 715/764 |
| 2008/0104168 A1* | 5/2008 | McConnell et al. | 709/203 |
| 2008/0168364 A1* | 7/2008 | Miller et al. | 715/762 |
| 2008/0177994 A1 | 7/2008 | Mayer | |
| 2009/0063986 A1* | 3/2009 | Camenisch et al. | 715/733 |
| 2009/0094523 A1* | 4/2009 | Treder et al. | 715/738 |
| 2009/0174663 A1* | 7/2009 | Rudd | 345/168 |
| 2009/0267949 A1* | 10/2009 | Friesen | 345/473 |
| 2010/0053027 A1 | 3/2010 | Tonnison et al. | |
| 2010/0100831 A1* | 4/2010 | Whytock et al. | 715/764 |
| 2010/0146455 A1* | 6/2010 | Wilson et al. | 715/860 |
| 2010/0238089 A1* | 9/2010 | Massand | 345/1.1 |
| 2010/0293499 A1* | 11/2010 | Young et al. | 715/779 |
| 2010/0295770 A1* | 11/2010 | Shim | 345/156 |
| 2011/0107272 A1* | 5/2011 | Aguilar | 715/853 |
| 2011/0219313 A1* | 9/2011 | Mazzaferri | 715/740 |
| 2011/0239114 A1* | 9/2011 | Falkenburg et al. | 715/702 |
| 2011/0275391 A1* | 11/2011 | Lee et al. | 455/500 |
| 2012/0005602 A1* | 1/2012 | Anttila et al. | 715/761 |
| 2012/0042271 A1* | 2/2012 | Ma et al. | 715/768 |
| 2012/0050161 A1* | 3/2012 | Andersson et al. | 345/158 |
| 2012/0050183 A1* | 3/2012 | Lee | 345/173 |
| 2012/0079414 A1* | 3/2012 | Eischeid et al. | 715/781 |
| 2012/0084675 A1* | 4/2012 | Sirpal et al. | 715/761 |
| 2012/0089992 A1* | 4/2012 | Reeves et al. | 719/318 |
| 2012/0154341 A1* | 6/2012 | Chan et al. | 345/204 |
| 2012/0225716 A1* | 9/2012 | Yamamoto et al. | 463/31 |
| 2012/0304092 A1* | 11/2012 | Jarrett et al. | 715/765 |
| 2013/0002568 A1* | 1/2013 | Selim | 345/173 |
| 2013/0027289 A1* | 1/2013 | Choi et al. | 345/156 |
| 2013/0111360 A1* | 5/2013 | Kodama et al. | 715/753 |
| 2013/0120251 A1* | 5/2013 | Lee et al. | 345/157 |
| 2013/0190089 A1* | 7/2013 | Wilson et al. | 463/36 |
| 2013/0283181 A1* | 10/2013 | Mazzaferri | 715/740 |

OTHER PUBLICATIONS

"Dual monitors for easier multi-tasking", Retrieved at <<http://h20271.www2.hp.com/SMB-AP/cache/461720-0-0-190-121.html>>, Retrieved Date: Jun. 15, 2011, pp. 2.

* cited by examiner

DISPLAY ENVIRONMENT FOR A PLURALITY OF DISPLAY DEVICES

BACKGROUND

Users have access to an ever increasing functionality that may be provided by computing devices. From browsers to word processors, spreadsheets, calendaring and email applications, and so on, a user may execute a wide number of applications at any one time to view information from these applications.

In order to increase the amount of information that is viewable at a particular time, a user may employ a plurality of display devices (e.g., monitors) that are communicatively coupled to a single computing device. In this way, a user increases an amount of area that is available to display data from the applications that are executed on the computing device. However, this increase in display area could also negatively affect traditional techniques for user interaction that were generally based on a single display device.

SUMMARY

A display environment for a plurality of display devices is described. In one or more implementations, a display environment of an operating system of a computing device is configured to display a plurality of shells that support user interaction with the operating system by launching a first shell for display on a first display device of the computing device and launching a second shell for display on a second display device of the computing device such that the first and second shells are displayable simultaneously by the computing device.

In one or more implementations, an input is received by a computing device to initiate execution of an application by the computing device. A determination is made as to which of a plurality of display devices of the computing device with which a user interacted to provide the input. Execution of the application is launched to display a user interface associated with the application on the determined display device.

In one or more implementations, one or more computer readable storage media comprise instructions stored thereon that, in response to execution by a computing device, cause the computing device to configure a display environment of an operating system executed by the computing device for display of launch functionality configured to initiate execution of an application, the launch functionality displayable on each of a plurality of display devices that output the display environment of the computing device without reconfiguring settings of the launch functionality to specify a particular one of the plurality of display devices that is to display the launch functionality.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
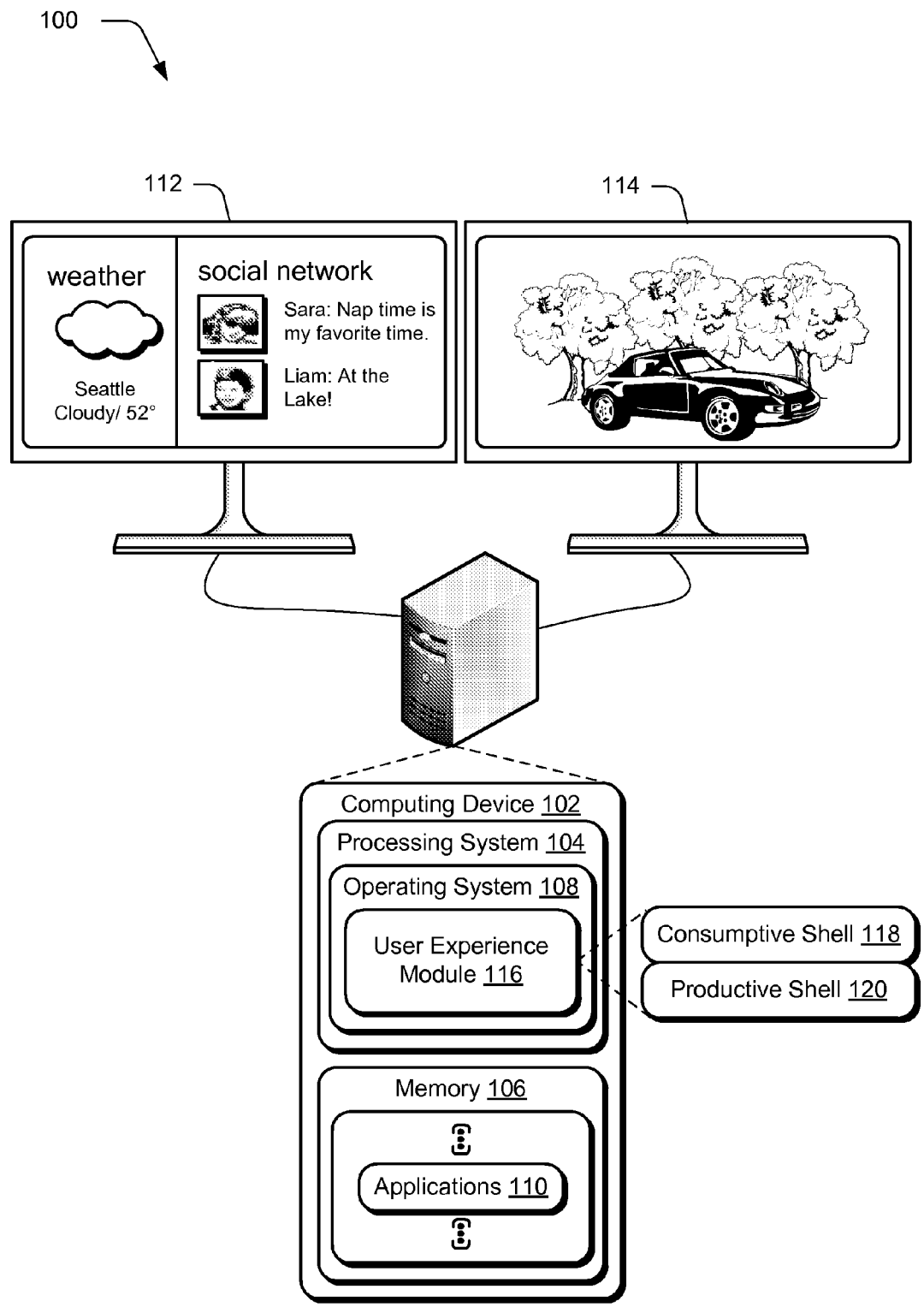
FIG. 1 is an illustration of an environment in an example implementation that is operable to implement the display environment techniques that involve a plurality of display devices that are described herein.

Users often employ a plurality of display devices when interacting with a single computing device in order to increase an amount of display area that is available to display data to the user. However, traditional display environments were often designed with a single display device in mind. Therefore, even though the display environment could be expanded across a plurality of display devices, this expansion could hinder interaction supported by the traditional display environment.

A display environment for a plurality of display devices is described. In one or more implementations, an operating system is configured to support a plurality of shells via which a user may interact with the operating system. Accordingly, the display environment output by the operating system may be configured to support these shells. For example, the display environment may be configured to display each of the shells on a different display device such that a user may view data from the shells simultaneously.

Further, the display environment may be configured to make a switch between shells responsive to a user action. For instance, a user may drag a window from a display device that outputs a productive shell (e.g., a desktop shell) to a display device that outputs a consumptive shell, e.g., an immersive shell configured primarily to support touch interaction. This may cause the display device that displayed the consumptive shell to switch to a productive shell. In another instance, an application for output in a consumptive shell may be launched for display on a display device that currently outputs a productive shell. In this instance, the display device may also make a switch, but in this case from a productive shell to a consumptive shell. Further discussion of display of different shells, consumptive and productive shells, and so on may be found in relation to the following discussion.

In one or more implementations, the display environment may be configured to display applications on display devices from which the application was launched. For example, a computing device may be communicatively coupled to a plurality of display devices as described above. An input may be received from a particular one of the display devices to launch an application, such as a selection of a representation of the application in a launch menu displayed on the particular display device. In this example, the launch menu (e.g., a system UI) may be invoked on any of the display devices. Accordingly, data from execution of the application may be displayed on the particular display device. Thus, a user may readily choose which display device is to display data from an application by initiating execution of the application on that display device. Further discussion of this implementation may also be found in relation to the following discussion.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ the display environment techniques described herein. The illustrated environment 100 includes a computing device 102 having a processing system 104 and a computer-readable storage medium that is illustrated as a memory 106 although other confirmations are also contemplated as further described below.

The computing device 102 may be configured in a variety of ways. For example, a computing device may be configured as a computer that is capable of communicating over a network, such as a desktop computer, a mobile station, an entertainment appliance, a set-top box communicatively coupled to a display device, a wireless phone, a game console, and so forth. Thus, the computing device 102 may range from full resource devices with substantial memory and processor resources (e.g., personal computers, game consoles) to a low-resource device with limited memory and/or processing resources (e.g., traditional set-top boxes, hand-held game consoles). Additionally, although a single computing device 102 is shown, the computing device 102 may be representative of a plurality of different devices, such as multiple servers utilized by a business to perform operations such as by a web service, a remote control and set-top box combination, an image capture device and a game console configured to capture gestures, and so on.

The computing device 102 is further illustrated as including an operating system 108. The operating system 108 is configured to abstract underlying functionality of the computing device 102 to applications 110 that are executable on the computing device 102. For example, the operating system 108 may abstract the processing system 104, memory 106, display devices 112, 114, network, and other functionality of the computing device 102 such that the applications 110 may be written without knowing "how" this underlying functionality is implemented. The application 110, for instance, may provide data to the operating system 108 to be rendered and displayed by the display devices 112, 114 without understanding how this rendering will be performed. The operating system 108 may also represent a variety of other functionality, such as to manage a file system and user interface that is navigable by a user of the computing device 102.

The operating system 108 is also illustrated as including a user experience module 116 which is representative of functionality of the computing device 102 to provide a plurality of shells via which a user may interact with the operating system 108 and the applications 110 and other data of the computing device 102, both local to the device as well as remotely via a network. The shells are configured to accept inputs to interact with the operating system 108 and applications 110 of the computing device 102 to access functionality of the computing device 102, such as the abstracted functionality described above. Examples of such shells include a consumptive shell 118 and a productive shell 120.

The consumptive shell 118 may be configured to support interaction with the applications 110 with little to no window frame. Additionally, the consumptive shell 118 may support interaction with the applications 110 without requiring the user to manage a corresponding window frame's layout, primacy of the window with respect to other windows (e.g., whether a window is active, in front of behind other windows, an order of the windows, and so on). Although illustrated as part of the operating system 108, the user experience module 116 may be implemented in a variety of other ways, such as a stand-alone module, remotely via a network, and so forth.

In one or more implementations, the consumptive shell 118 of the operating system 108 is configured such that it is not closeable or capable of being uninstalled apart from the operating system 108. Additionally, the consumptive shell 118 may be configured to consume a significant portion of an available display area of a display device, as shown through display of the consumptive shell 118 on the first display device 112. A user may interact with the consumptive shell 118 in a variety of ways, such as via a cursor control device, using one or more gestures, using speech recognition, capture using one or more depth-sensing cameras, and so on.

Thus, the user experience module 116 may manage the consumptive shell 118 in which content of applications 110 may be presented and the presentation may be performed without requiring a user to manage size, location, primacy, and so on of windows used to display the content of the applications 110.

For example, as shown on a user interface displayed by the first display device 112, a user interface is shown that is configured to display data from two applications in a "snapped" configuration. In this example, both of the applications that correspond to the data are enable to actively execute by the computing device 102 while execution is suspended for other of the applications 110 that do not currently display data. A gutter displayed as a line between the two applications (e.g., "weather" and "social network") is disposed between the displays of the data that may be moveable to change an amount of display area consumed by applications on the first display device 112, respectively, in the consumptive shell 118.

The consumptive shell 118 may support a wide variety of functionality to provide an immersive experience for a user to access the applications 110. In the following discussion, this functionality is discussed in relation to leveraging these techniques to enable interaction with a productive shell 120. It should be readily apparent, however, that these techniques may be employed for managing interaction with the applications 110 themselves without departing from the spirit and scope thereof.

As illustrated, the user experience module 116 also supports a productive shell 120, an example of which is shown as a desktop displayed on the second display device 114. The productive shell 120 is representative of another configuration of a user interface output by the operating system 108 when in this example is to interact with the applications 110 and other data. For example, the productive shell 120 may be configured to present applications and corresponding data through windows having frames. These frames may provide controls through which a user may interact with an application as well as controls enabling a user to move and size the window. The productive shell 120 may also support techniques to navigate through a hierarchical file structure through the use of folders and represent the data and applications through use of icons. In one or more implementations, the productive shell 120 may also be utilized to access applications 110 that are configured specifically for interaction via the productive shell 120 and not configured for access via the consumptive shell 118, although other implementation are also contemplated.

In one or more of the techniques described herein, the user experience module 116 is configures a display environment that that may employ a plurality of display devices, such as the first and second display devices 112, 114 as illustrated although greater numbers of display devices are also contemplated. Further discussion of the display environment may be found beginning in relation to FIG. 2 below.

Generally, any of the functions described herein can be implemented using software, firmware, hardware (e.g., fixed logic circuitry), or a combination of these implementations. The terms "module," "functionality," and "engine" as used herein generally represent software, firmware, hardware, or a combination thereof. In the case of a software implementation, the module, functionality, or engine represents program code that performs specified tasks when executed on a processor (e.g., CPU or CPUs). The program code can be stored in one or more computer readable memory devices. The features of the techniques described below are platform-independent, meaning that the techniques may be implemented on a variety of commercial computing platforms having a variety of processors.

For example, the computing device 102 may also include an entity (e.g., software) that causes hardware of the computing device 102 to perform operations, e.g., processors, functional blocks, and so on. For example, the computing device 102 may include a computer-readable medium that may be configured to maintain instructions that cause the computing device, and more particularly hardware of the computing device 102 to perform operations. Thus, the instructions function to configure the hardware to perform the operations and in this way result in transformation of the hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Figure 2:
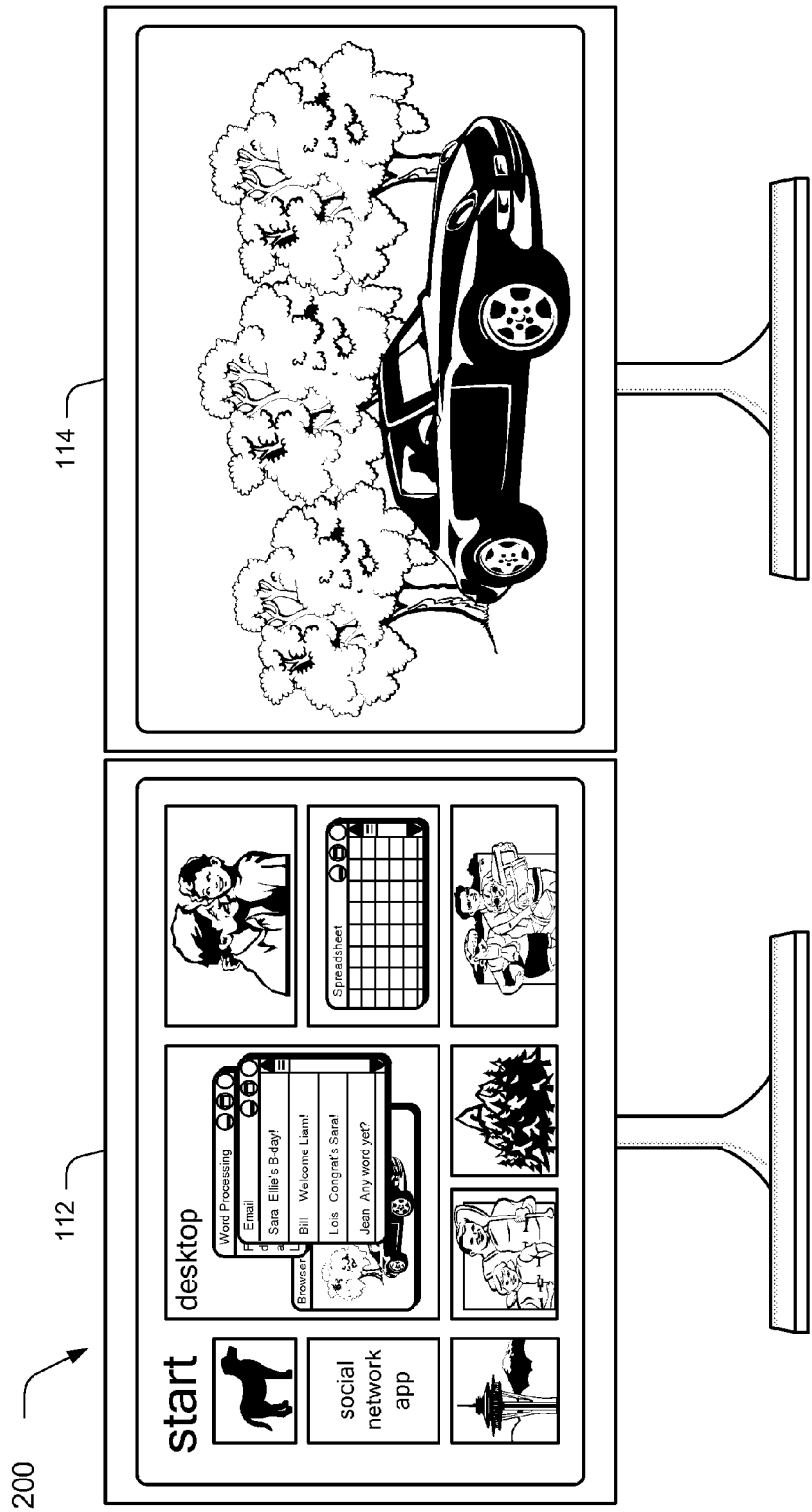
FIG. 2 is an illustration of a system in an example implementation of a computing device of FIG. 1 as employing a plurality of display devices to display a plurality of shells of an operating system simultaneously.

FIG. 2 illustrates a system 200 in an example implementation of the computing device 102 of FIG. 1 as employed a plurality of display devices to display a plurality of shells of an operating system simultaneously. The system 200 includes the first and second display devices 112, 114 of the computing device 102 of FIG. 1. The first display device 112 is illustrated as displaying a start screen of the consumptive shell 118 while the second display device 114 is illustrated as displaying a desktop of the productive shell 120.

The start screen includes a plurality of tiles that represent applications that are selectable for execution by the computing device 102. A variety of other representations are also contemplated without departing from the spirit and scope thereof. Selection of the tiles may be accomplished in a variety of ways. For example, a user may utilize a cursor control device, such as a mouse or track pad, to navigate a cursor to be displayed "over" a tile to be selected and "click" the tile to indicate the selection. In another example, gestures may be supported by the computing device 102, such as by tapping a desired representation to launch a corresponding application.

Figure 3:
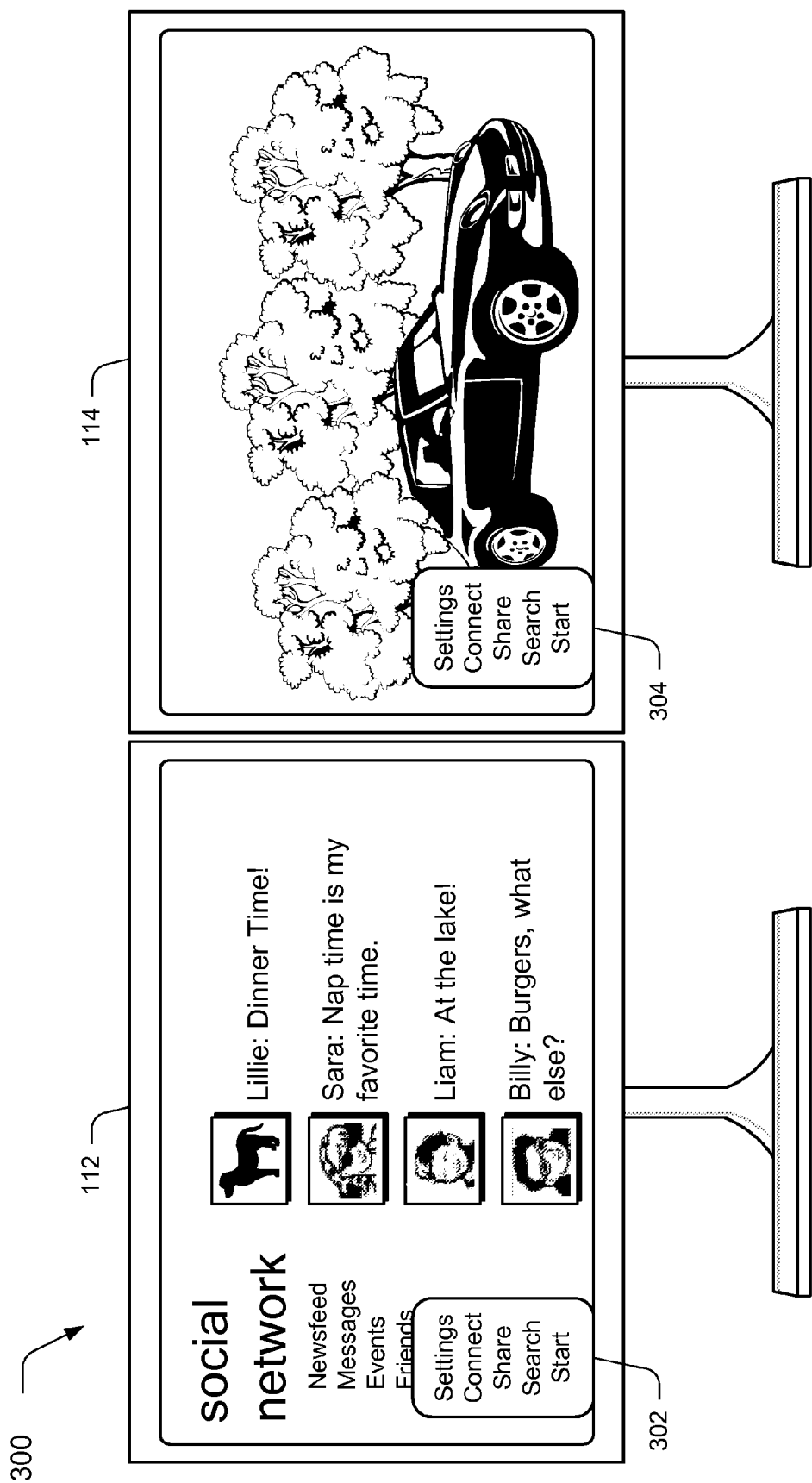
FIG. 3 is an illustration of an example system in which a social network application is launched into the consumptive shell on a first display device.

Responsive to the selection, the corresponding application 110 may be launched for execution by the computing device 102. An example of this is illustrated in the example system 300 of FIG. 3 in which the social network application is launched into the consumptive shell 118 on the first display device 112. The social network application is illustrated as providing a user interface that consumes approximately an entirety of a display area of the first display device 112. Additionally, the user interface of the social network application as illustrated does not include a window or "chrome" that is displayed along with the data of the application.

This technique may be repeated to launch a plurality of applications 110 for execution by the computing device 102. For example, a user may return to the start screen illustrated in FIG. 2 and select additional applications for execution, such as through selecting a "start" selection in a launch menu 302 of commands (e.g., system UI or "charms") as illustrated. Responsive to each selection, additional user interfaces may be output that substantially consume the available display area of the first display device 112.

Thus, the launch menu 302 may be used to initiate execution of an application through interaction using a particular display device and have the application launched on that display device. In this example, for instance, the start screen was displayed on the first display device 112 and a selection was made of the social network application on the first display device 112. In response, the user experience module 116 causes data from the selected application (e.g., the user interface application) to be displayed on the corresponding display device, e.g., the first display device in this example. Continuing with the example above successive launch of the applications in the consumptive shell 118 on the first display device 112 may also be performed using similar techniques.

A user may then navigate through the applications that have been selected for execution in the consumptive shell 118 in a variety of ways. For example, a user may interact with a left edge of the first display device 112 to cause the display of the social network application to be replaced with a display that corresponds to another application that was launched by the user as described above.

This interaction may be performed in a variety of ways, such as through maneuvering a cursor proximal to the left edge, a "swipe" gesture involving the left edge, and so on. This replacement may be performed non-modally by automatically cycling through the applications, modally through output of a menu having representations of the selected applications 110, and so on. Although interaction with the left edge is described for navigation through the applications 110, it should be readily apparent that different edges of the first display device 112 may be utilized to navigate through applications in the consumptive shell 118 as well as different navigation techniques without departing from the spirit and scope thereof.

As described above, launch functionality may be supported by the user experience module 116 for each of the plurality of display devices. As further illustrated in FIG. 3, for instance, a user may also cause output of a launch menu 304 on the second display device 114. The launch menu 304 may also include an option to cause the start screen of FIG. 2 to be output on the second display device 114, as further shown in FIG. 4.

Figure 4:
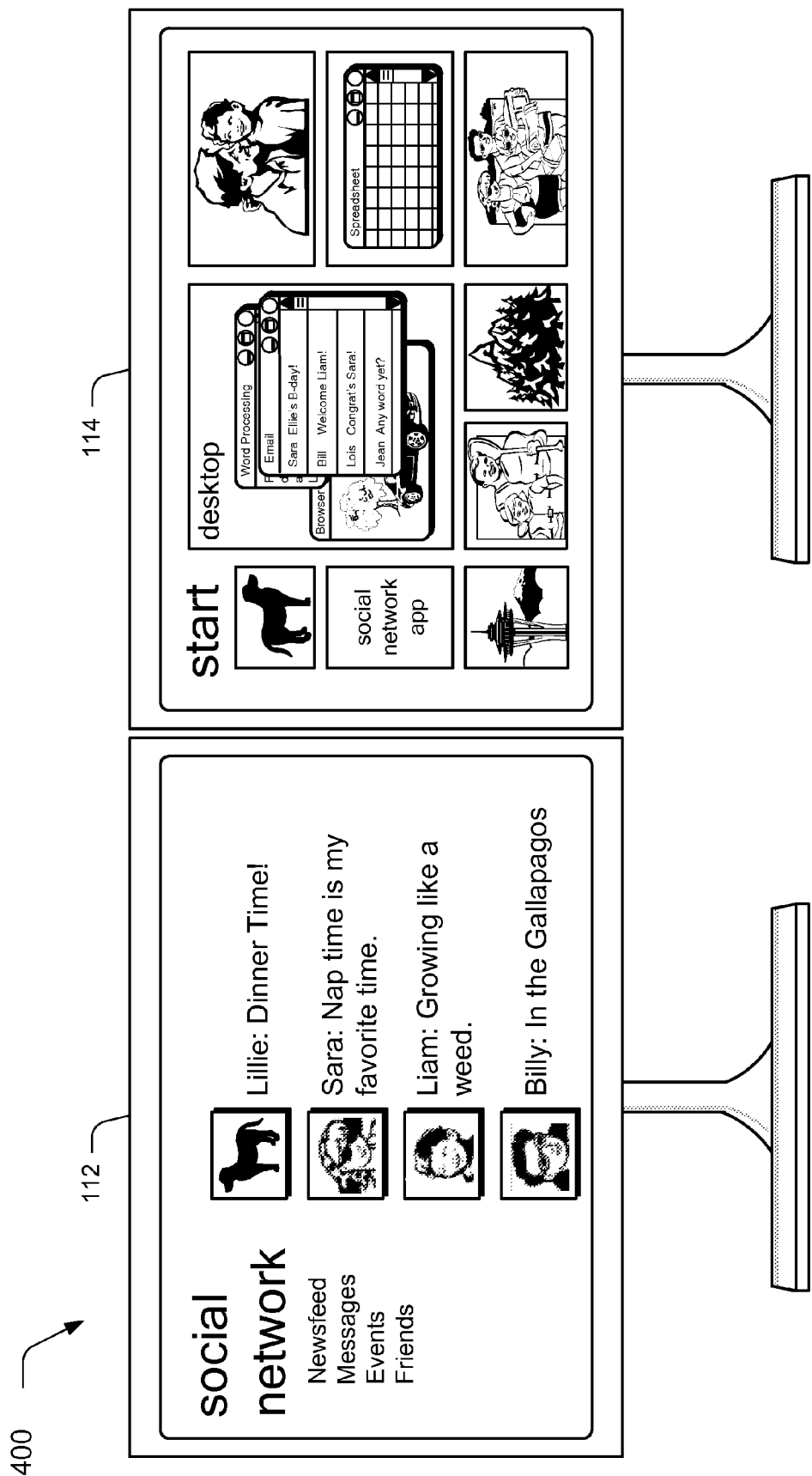
FIG. 4 is an illustration of a system in an example implementation in which a consumptive shell is depicted as being output on a first display device and a start screen is illustrated as being output on a second display device.

FIG. 4 depicts a system 400 in an example implementation in which a consumptive shell 118 is depicted as being output on the first display device 112 and a start screen is illustrated as being output on the second display device 114. As previously described the start screen may include a variety of different representations (e.g., tiles) that may be selected to initiate launch of a represented application 110. These applications may be configured for output in different shells. For example, the social network application as previously described may be configured for output in the consumptive shell 118. Accordingly, when the application is launched on a particular display device, that display device may configured for interaction using the corresponding shell, e.g., the consumptive shell 118 in this instance. Similar techniques may also be used to launch an application in a productive shell.

For example, a user may select a tile (e.g., a spreadsheet application) as before to cause data from the execution of the application to be output on the corresponding display device, which in this instance is the second display device 114 as illustrated in FIG. 4. This selection may be accomplished in a variety of ways, such as through a cursor control device, a gesture, and so on. In response to the selection of the representation, the user experience module 116 may determine which display device is being used to launch the application, which application is being launched, as well as which shell is to be utilized to interact with the application. Continuing with the illustrated example, the user experience module 116 may determine that the second display device 114 is being used to launch a spreadsheet application that is to be executed in a productive shell 120, a result of which is shown in FIG. 5.

Figure 5:
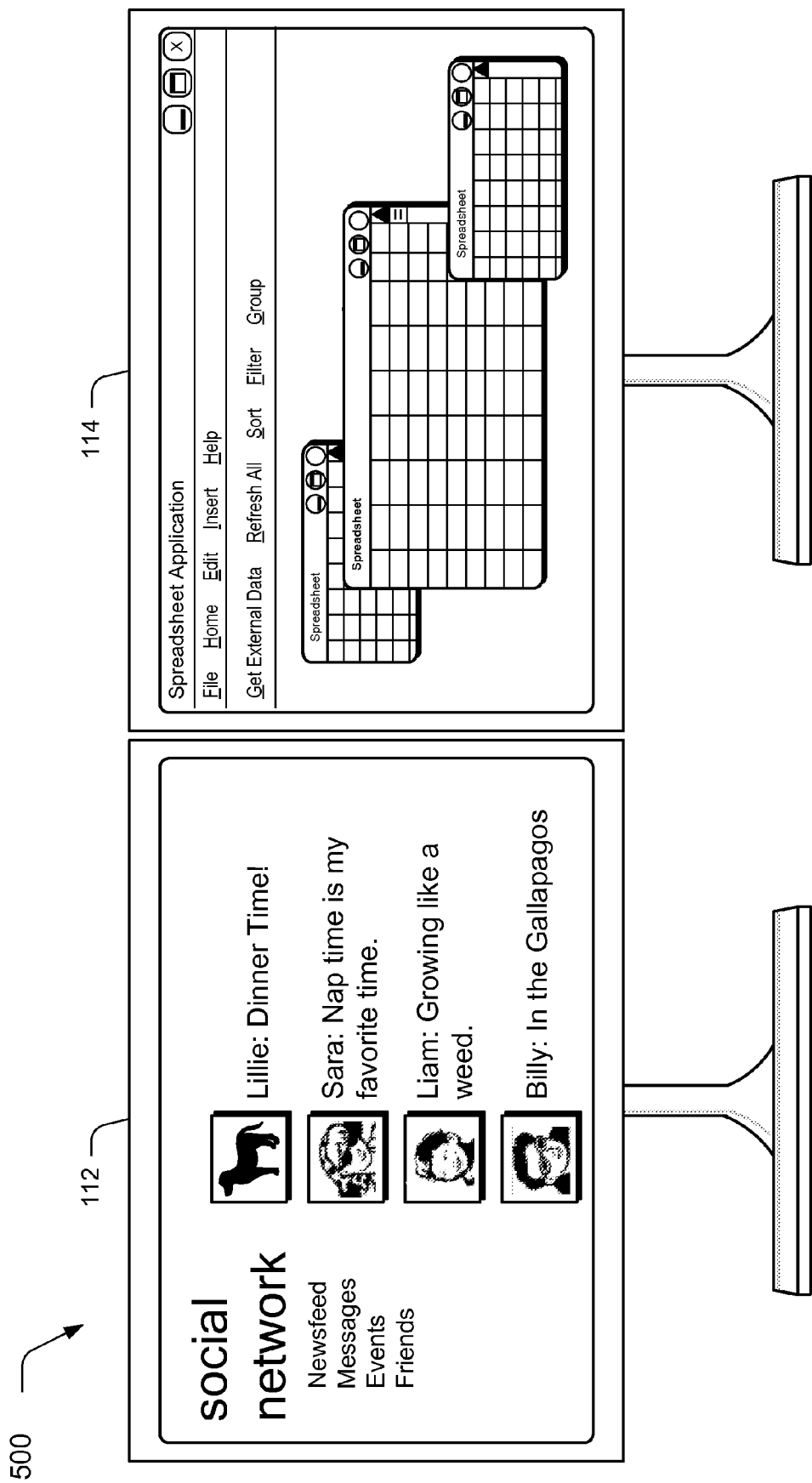
FIG. 5 is an illustration of a system in an example implementation in which an application configured for interaction via a consumptive shell is displayed on a first display device and another application that is configured for interaction via a productive shell is displayed on a second display device.

FIG. 5 depicts a system 500 in an example implementation in which an application configured for interaction via a consumptive shell 118 is displayed on a first display device 112 of the computing device 102 and another application that is configured for interaction via a productive shell 120 is displayed on a second display device 120. As shown in this figure, applications from different shells of an operating system 108 may be accessed using respective display devices.

Further, as described in the preceding examples the display devices 112, 114 may be "set" to output a particular one of a plurality of shells based on a user action, which was through interaction with a launch menu. A variety of other user interactions may also be leveraged by the user experience module 116 to determine which shell is to be used by a respective one of a plurality of display devices, another example of which may be found beginning in relation to the following figure.

Figure 6:
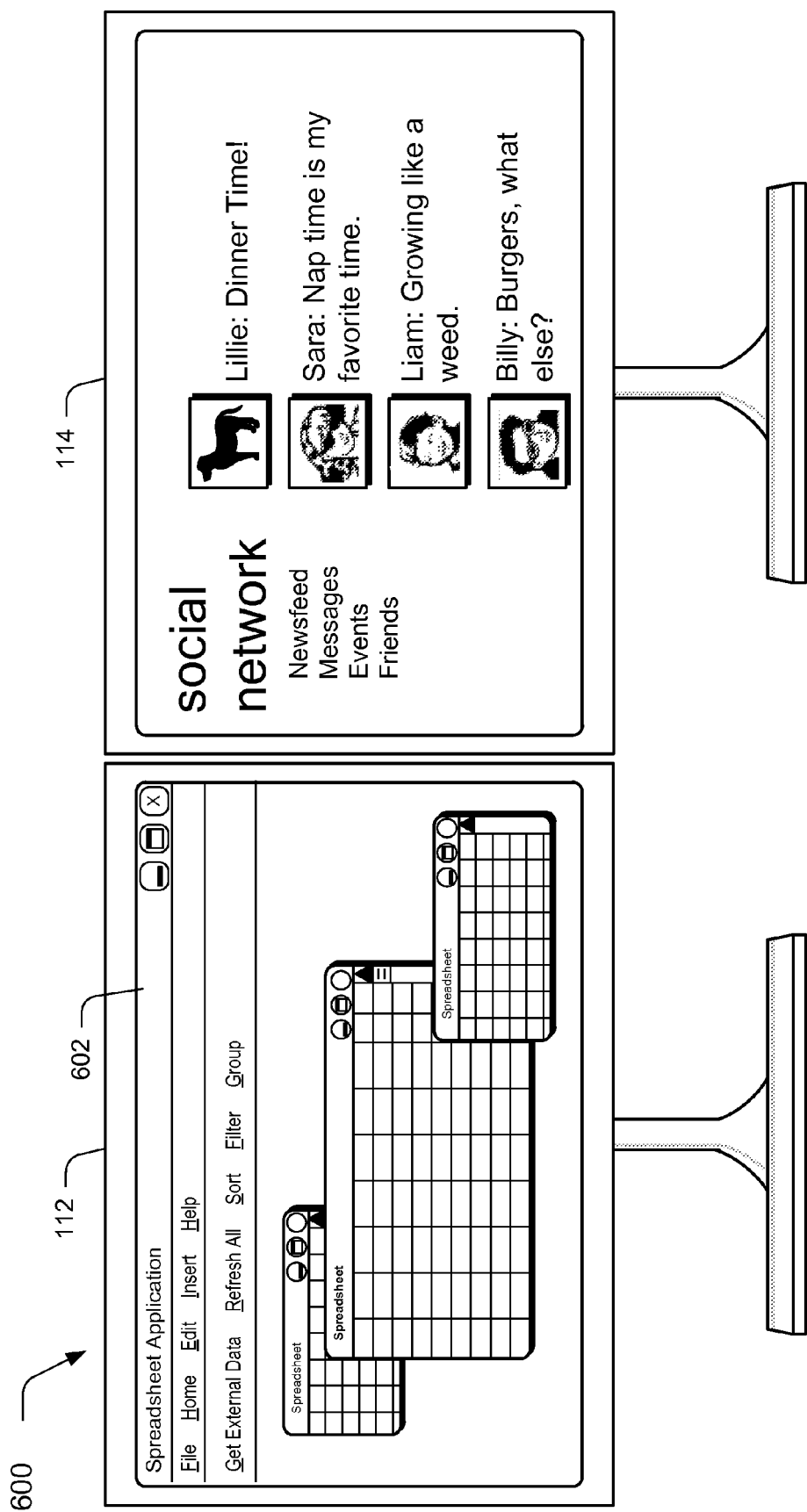
FIG. 6 is an illustration of a system in an example implementation in which user interaction is detected by a user experience module as indicating an intent to cause a switch between shells of an operating system.

FIG. 6 depicts a system 600 in an example implementation in which a user interaction is detected by a user experience module 116 as indicating an intent to cause a switch between shells of an operating system 108. In this example, a first display device 112 is used to display a user interface for interaction with a productive shell 120 and a second display device 114 is used to display a user interface for interaction with a consumptive shell 118. The first display device 112, for instance, is illustrated as displaying data from a spreadsheet application, which includes a plurality of windows and "chrome" within a primary window 602 that corresponds to the application.

A user may select the window 602 (e.g., the window containing the spreadsheet application) in a variety of ways to move the window 602 for display on a different location of the display environment. For example, a user may utilize a "click-and-drag" technique using a cursor control device, a "tap-and-slide" gesture, and so on. In response, the window 602 may then be moved across the first display device 112 by the user experience module 116 as further shown in the following figure.

Figure 7:
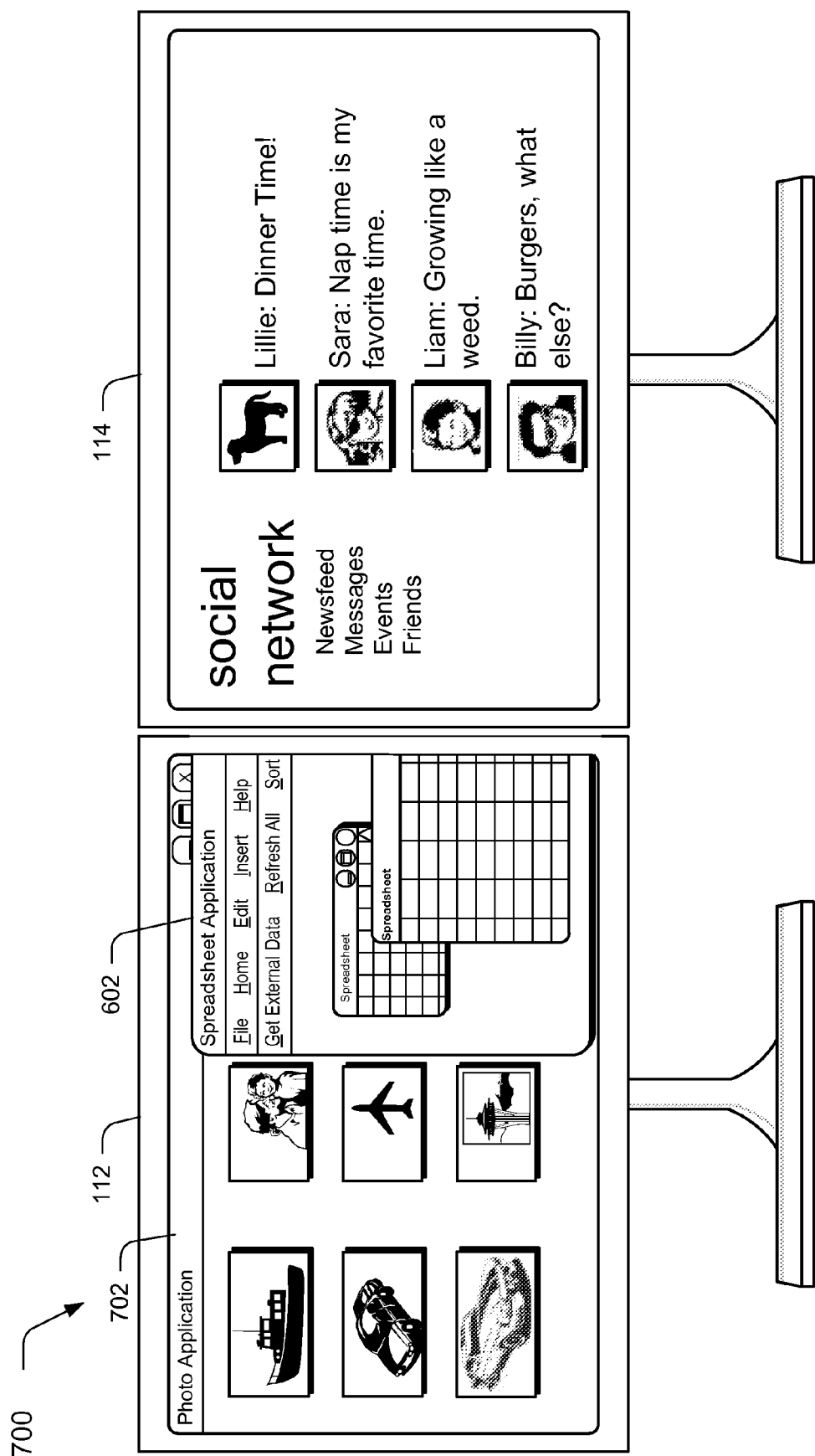
FIG. 7 is an illustration of a system in an example implementation showing movement of a window from a first display device that displays data from a productive shell to a second display device that displays data from a consumptive shell.

FIG. 7 depicts a system 700 in an example implementation showing movement of a window from a first display device 112 that displays data from a productive shell 120 to a second display device 114 that displays data from a consumptive shell 118. In this example, movement of the window 602 of the spreadsheet application is shown over a window 702 that corresponds to a photo application in the productive shell 120 displayed on the first display device 112.

In this way, the windows 602, 702 provide support of a display of depth such that data from the one application appears to be displayed over at least a portion of data from another application. Similar techniques may be utilized to display data from the same application, such as the sub-windows within the window 602 of the spreadsheet application as illustrated. As stated previously, the consumptive shell, outside of the productive shell, is not so configured but rather is configured primarily for touch (although a cursor control device may also be utilized) in comparison with the productive shell.

The user experience module 116 may then detect movement of the window 602 past a threshold, e.g., a cursor and/or touch point is within a predefined range of an edge of the first display device 602, a cursor "crosses over" into the second display device 114 while selecting the window 602, and so on. In response, the user experience module 116 may cause a switch from the consumptive shell 118 in the second display device 114 to the productive shell 120, a result of which is shown in the following figure.

Figure 8:
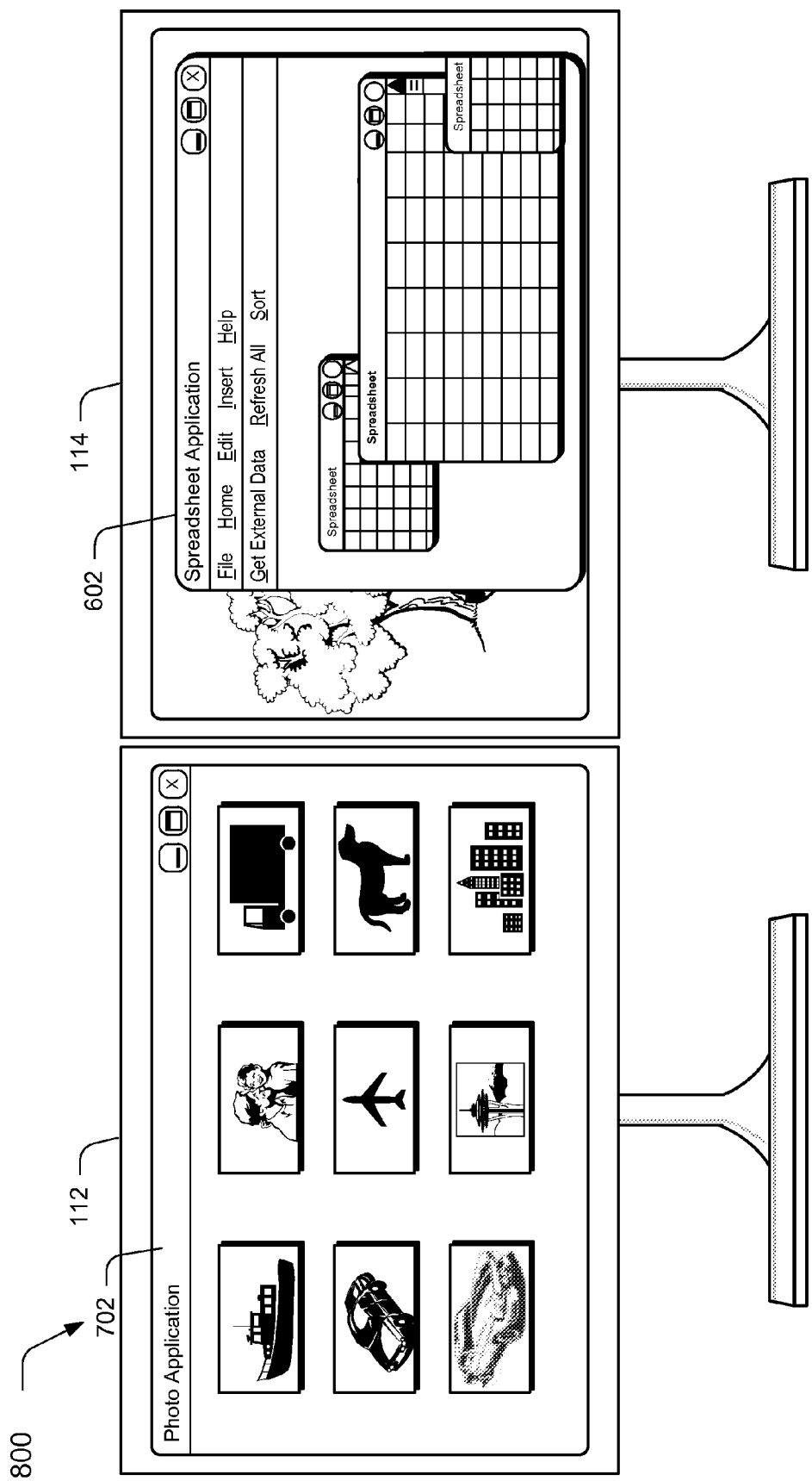
FIG. 8 is an illustration of a system in an example implementation showing first and second display devices as displaying data from a productive shell.

FIG. 8 depicts a system 800 in an example implementation showing first and second display devices 112, 114 as displaying data from a productive shell 120. The second display device 114 in this example is shown as display the window 602 of the spreadsheet application over a desktop in the productive shell 120. The first display device 112 is also still illustrated as displaying the window 702 of the photo application in the productive shell 120. Thus, in the example described in relation to FIGS. 6-8 a user interaction that involves movement of the window from one display device to another is used to indicate that the display device is to be placed in a corresponding shell of the operating system 108 if not already so configured. Applications that were already executed within the previous shell may be addressed in a variety of ways, such as minimized, formed for execution within a corresponding window if such execution is supported, cause execution of the application to be ceased, and so on. Thus, a variety of different techniques may be leveraged by the user experience module to support a display environment for a plurality of display devices, further discussion of which may be found in relation to the following procedures.

Example Procedures

The following discussion describes display environment techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the systems 200-800 of FIGS. 2-8, respectively.

Figure 9:
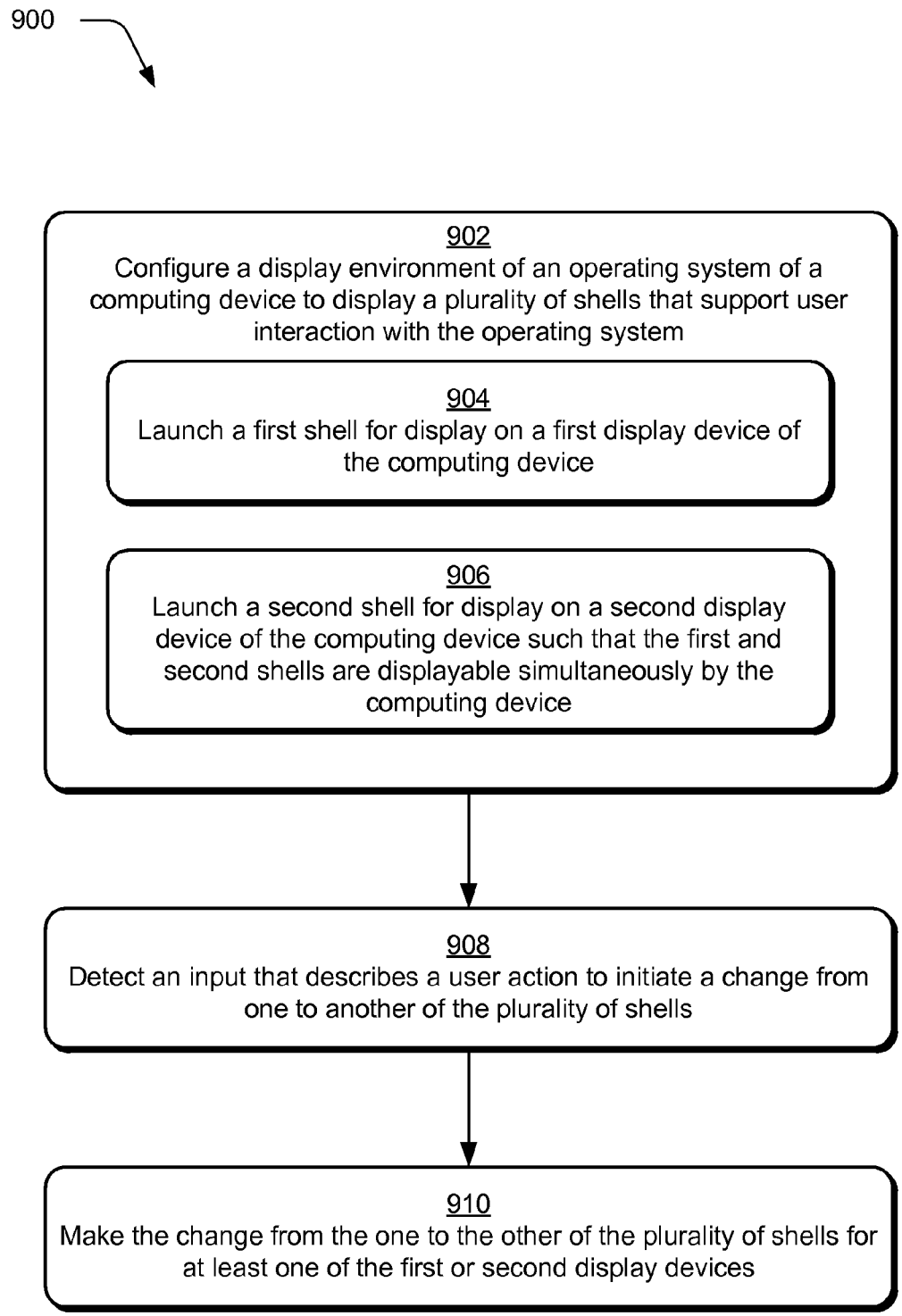
FIG. 9 is a flow diagram depicting a procedure in an example implementation in which a display environment is configured to support different shells of an operating system on different display devices.

FIG. 9 depicts a procedure 900 in an example implementation in which a display environment is configured to support different shells of an operating system on different display devices. A display environment of an operating system of a computing device is configured to display a plurality of shells that support user interaction with the operating system (block 902). For example, a first shell may be launched for display on a first display device of the computing device (block 904), e.g., by a user experience module 116. Likewise, a second shell may be launched for display on a second display device of the computing device such that the first and second shells are displayable simultaneously by the computing device (block 904). The shells may be configured in a variety of ways by the user experience module 116.

For example, the shells may include consumptive (e.g., immersive) and productive (e.g., desktop) shells 118, 120. As described above, the consumptive shell may be configured to support user interaction that is based primarily on touch in comparison with user interaction supported by the productive shell that is based primarily on use of a cursor control device. Additionally, the productive shell may be configured to support display of a plurality of windows that correspond to a plurality of applications that are executable within the productive shell and the consumptive shell, outside of the productive shell, is not so configured. Rather, the consumptive shell may be configured to provide a substantially "full screen" experience with limited chrome, may support "snapping" behavior, and so on. Further, the productive shell may be configured to employ chrome and a task bar and the consumptive shell, outside of the productive shell, is not so configured. Yet further, the productive shell may be configured to support a display of depth such that data from one application appears to be displayed over at least a portion of data from another application and the consumptive shell, outside of the productive shell, is not so configured. A variety of other examples are also contemplated of differences between the consumptive 118 and productive 120 shells of the operating system 108.

Additionally, an input may be detected that describes a user action to initiate a change from one to another of the plurality of shells (block 908). The change may then be made from the one to the other of the plurality of shells for at least one of the first or second display devices (block 910). A variety of different user actions may be detected. For example, a user may interact with launch functionality such as a launch menu as described in relation to FIG. 3 to select particular application to be launched in a respective display device. A shell that corresponds to the application (e.g., via which execution of the application is accessible) may then be launched by the user experience module 116. In one or more implementations, applications 110 are configured to execute within a particular shell and therefore and not executable "outside" that shell, i.e., in a different shell. Other implementations are also contemplated.

In another example as described in relation to FIGS. 6-8, movement of an item that is executable within one shell to another display device that is currently associated with another shell may cause a change to the "correct" shell. For instance, movement of a window from a display device that displayed a productive shell 120 to a display device that displays a consumptive shell 118 may cause a change to the productive shell on that device. Other examples are also contemplated. Naturally, although first and second display devices are described in the previous example, a greater number of display devices and shells are also contemplated which may also leverage the techniques described above.

Figure 10:
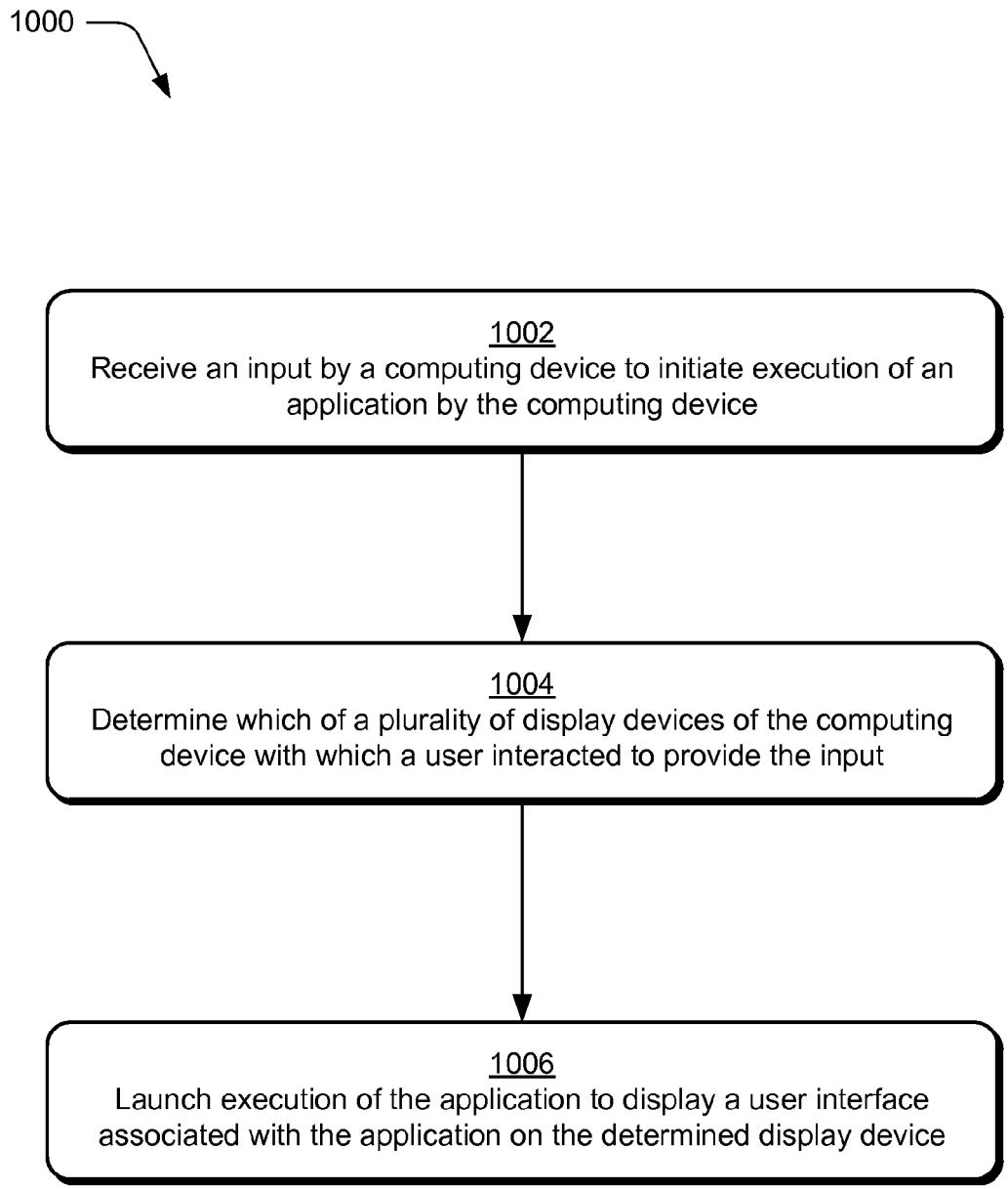
FIG. 10 is a flow diagram depicting a procedure in an example implementation in which a display environment is configured to support display of data on a particular one of a plurality of display devices based on which display device support the interaction to provide the input to launch the application.

FIG. 10 depicts a procedure 1000 in an example implementation in which a display environment is configured to support display of data on a particular one of a plurality of display devices based on which display device support the interaction to provide the input to launch the application. An input is received by a computing device to initiate execution of an application by a computing device (block 1002). A user, for instance, may select a representation of an application in a start screen, using launch functionality (e.g., a launch menu, system UI), and so on. The user experience module 116, for example, may configure a display environment such that the launch menu is accessible via a plurality (e.g., each) of display devices of the computing device 102.

Further, in one or more implementations this functionality may be supported without manually setting configuration settings to make the change. Previously, a user could select which of a plurality of display devices was to display a launch menu, e.g., as a pop-up menu, task bar, and so on. However, this selection prevented output on other display devices currently being used. Thus, although the launch menu could be output on different display devices a user was first forced to configure which device was to be allowed to output the launch menu. However, in this implementation each display device may display the launch menu, such as through detection of interaction of a user with an edge (e.g., bottom edge) of the display device using a cursor control device, gesture, and so on.

Accordingly, a determination may be made as to which of a plurality of display devices of the computing device with which a user interacted to provide the input (block 1004). Continuing with the previous example, the user experience module 116 may determine which display device outputted the start menu, launch menu, and so on and also via which device an input was received selecting a particular application, e.g., a representation of the application in the task bar, launch menu, start menu, and so on.

Execution of the application may then be launched to display a user interface associated with the application on the determined display device (block 1006). The user experience module 116, for instance, may display a window associated with the application in a productive shell 120, employ an immersive experience using a consumptive shell 118, and so on. A variety of other examples are also contemplated without departing from the spirit and scope thereof.

Example Device

Figure 11:
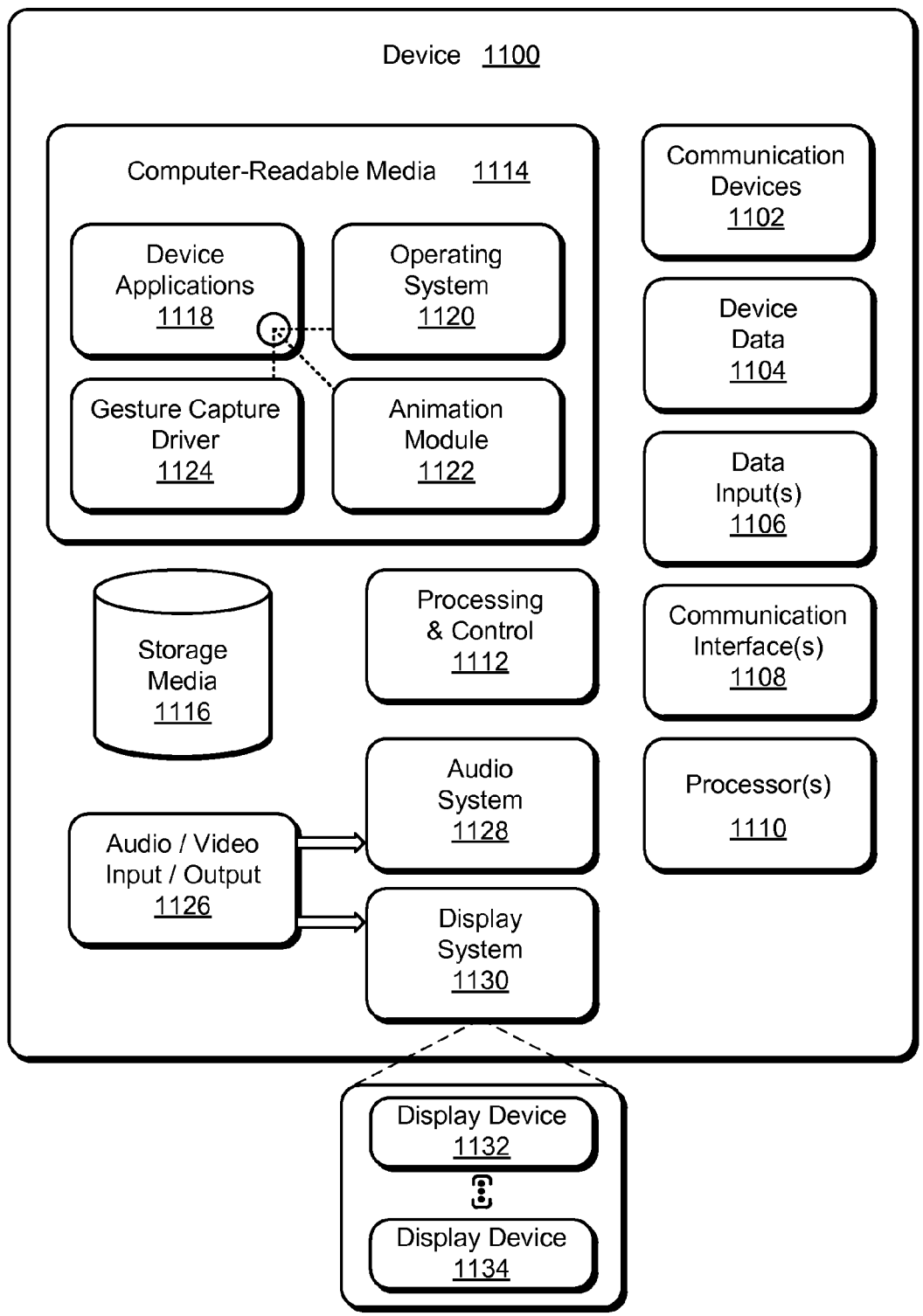
FIG. 11 illustrates various components of an example device that can be implemented as any type of computing device as described with reference to FIGS. 1-8 to implement embodiments of the techniques described herein.

FIG. 11 illustrates various components of an example device 1100 that can be implemented as any type of computing device as described with reference to FIGS. 1-8 to implement embodiments of the display environment techniques described herein. Device 1100 includes communication devices 1102 that enable wired and/or wireless communication of device data 1104 (e.g., received data, data that is being received, data scheduled for broadcast, data packets of the data, etc.). The device data 1104 or other device content can include configuration settings of the device, media content stored on the device, and/or information associated with a user of the device. Media content stored on device 1100 can include any type of audio, video, and/or image data. Device 1100 includes one or more data inputs 1106 via which any type of data, media content, and/or inputs can be received, such as user-selectable inputs, messages, music, television media content, recorded video content, and any other type of audio, video, and/or image data received from any content and/or data source.

Device 1100 also includes communication interfaces 1108 that can be implemented as any one or more of a serial and/or parallel interface, a wireless interface, any type of network interface, a modem, and as any other type of communication interface. The communication interfaces 1108 provide a connection and/or communication links between device 1100 and a communication network by which other electronic, computing, and communication devices communicate data with device 1100.

Device 1100 includes one or more processors 1110 (e.g., any of microprocessors, controllers, and the like) which process various computer-executable instructions to control the operation of device 1100 and to implement embodiments of the techniques described herein. Alternatively or in addition, device 1100 can be implemented with any one or combination of hardware, firmware, or fixed logic circuitry that is implemented in connection with processing and control circuits which are generally identified at 1112. Although not shown, device 1100 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 1100 also includes computer-readable media 1114, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 1100 can also include a mass storage media device 1116.

Computer-readable media 1114 provides data storage mechanisms to store the device data 1104, as well as various device applications 1118 and any other types of information and/or data related to operational aspects of device 1100. For example, an operating system 1120 can be maintained as a computer application with the computer-readable media 1114 and executed on processors 1110. The device applications 1118 can include a device manager (e.g., a control application, software application, signal processing and control module, code that is native to a particular device, a hardware abstraction layer for a particular device, etc.). The device applications 1118 also include any system components or modules to implement embodiments of the techniques described herein. In this example, the device applications 1118 include an interface application 1122 and an input/output module 1124 that are shown as software modules and/or computer applications. The input/output module 1124 is representative of software that is used to provide an interface with a device configured to capture inputs, such as a touchscreen, track pad, camera, microphone, and so on. Alternatively or in addition, the interface application 1122 and the input/output module 1124 can be implemented as hardware, software, firmware, or any combination thereof. Additionally, the input/output module 1124 may be configured to support multiple input devices, such as separate devices to capture visual and audio inputs, respectively.

Device 1100 also includes an audio and/or video input-output system 1126 that provides audio data to an audio system 1128 and/or provides video data to a display system 1130, which may include a plurality of display device 1132, 1134. The audio system 1128 and/or the display system 1130 can include any devices that process, display, and/or otherwise render audio, video, and image data. Video signals and audio signals can be communicated from device 1100 to an audio device and/or to a display device via an RF (radio frequency) link, S-video link, composite video link, component video link, DVI (digital video interface), analog audio connection, or other similar communication link. In an embodiment, the audio system 1128 and/or the display system 1130 are implemented as external components to device 1100. Alternatively, the audio system 1128 and/or the display system 1130 are implemented as integrated components of example device 1100.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   configuring a display environment of an operating system of a computing device to display a plurality of shells that support user interaction with the operating system by;
   launching a first said shell for display on a first display device of the computing device, the first said shell being a consumptive shell not configured to support a display of depth such that data from one application appears to be displayed over at least a portion of data from another said application; and
   launching a second said shell for display on a second display device of the computing device such that the first and second said shells are displayable simultaneously by the computing device, the second said shell being a productive shell configured to support the display of depth such that data from the one application appears to be displayed over at least a portion of data from the another said application.

2. A method as described in claim 1, wherein the display environment is configured such that each said display device is configured to display a single one of the plurality of shells of the operating system, respectively.

3. A method as described in claim 1, wherein the display environment is configured to allow a user to select a particular one of the plurality of shells for input by the user, the configured display environment does not support simultaneous input by the user with the first and second said shells.

4. A method as described in claim 1, wherein the consumptive shell is configured to support user interaction that is based primarily on touch in comparison with user interaction supported by the productive shell that is based primarily on use of a cursor control device.

5. A method as described in claim 1, wherein the productive shell is configured to support display of a plurality of windows that correspond to a plurality of applications that are executable within the productive shell and the consumptive shell, outside of the productive shell, is not configured to support the display of the plurality of windows that correspond to the plurality of applications.

6. A method as described in claim 1, wherein the productive shell is configured to employ chrome and a task bar and the consumptive shell, outside of the productive shell, is not configured to employ chrome and the task bar, chrome comprising a window around the data of the application.

7. A method as described in claim 1, further comprising:
   detecting an input that describes a user action to initiate a change from one to another of the plurality of shells; and
   making the change from the one to the other of the plurality of shells for at least one of the first or second display devices.

8. A method as described in claim 7, wherein the input describes moving a window from a productive said shell of the first display device to a consumptive said shell of the second display device, wherein making the change causes the consumptive said shell to be replaced by the productive said shell on the second display device.

9. A method as described in claim 7, wherein the input describes launching an application configured for execution in a consumptive said shell of the first display device that currently is configured to output a productive said shell, wherein making the change causes the productive said shell to be replaced by the consumptive said shell on the first display device.

10. A method comprising:
   receiving an input by a computing device to initiate execution of an application by the computing device;
   determining which of a plurality of display devices of the computing device with which a user interacted to provide the input;
   changing from a consumptive shell to a productive shell or a productive shell to a consumptive shell on the determined display device, the change of shell type based on the application initiated, the productive shell configured to support display of windows that correspond to other applications that are executable within the productive shell, the consumptive shell not configured to support display of windows that correspond to other applications that are executable within the consumptive shell; and
   launching execution of the application to display a user interface in the consumptive or the productive shell associated with the application on the determined display device.

11. A method as described in claim 10, wherein the input is received via launch functionality that is displayable on each of the plurality of display devices.

12. A method as described in claim 11, wherein the launch functionality includes a launch menu having a representation of the application that is selectable to provide the input to initiate the execution of the application by the computing device.

13. A method as described in claim 12, wherein the launch menu is configured as a task bar displayable along an edge of a respective said display device.

14. One or more computer readable storage devices comprising stored computer executable instructions thereon that, in response to execution by a computing device, causes the computing device to configure a display environment of an operating system executed by the computing device for display of launch functionality configured to initiate execution of an application, the launch functionality displayable on each of a plurality of display devices that output the display environment of the computing device without reconfiguring settings of the launch functionality to specify a particular one of the plurality of display devices that is to display the launch functionality, the display devices displaying a consumptive shell or a productive shell, the productive shell is configured to employ chrome and a task bar and the consumptive shell, outside of the productive shell, is not configured to employ chrome and the task bar, chrome comprising a window around data of one or more applications displayed by the computing device.

15. One or more computer readable storage devices as described in claim 14, wherein the launch functionality includes a launch menu having a representation of the application that is selectable to provide the input to initiate the execution of the application by the computing device.

16. One or more computer readable storage devices as described in claim 15, wherein the launch menu is configured as a task bar displayable along an edge of a respective said display device.

17. One or more computer readable storage devices as described in claim 15, wherein the task bar includes auto-hide functionality such that the task bar is displayable on a respective said display device responsive to an input received at the respective said display device.

18. One or more computer readable storage devices as described in claim 15, wherein the task bar includes at least one representation of an application that is currently executed on the computing device, the representation selectable to navigate to the application.

19. One or more computer readable storage devices as described in claim 14, wherein the display environment of the operating system includes the plurality of display devices, a first display device configured to display the consumptive shell and a second display device configured to display the productive shell, the consumptive shell configured to support user interaction that is based primarily on touch and the productive shell configured to support user interaction that is based primarily on use of a cursor control device.

20. A method as described in claim 1, wherein the productive and consumptive shells can be switched on one or both of the respective display devices via launch functionality that is displayable on each of the plurality of display devices.

* * * * *